(12) United States Patent
Meintrup et al.

(10) Patent No.: US 7,647,366 B2
(45) Date of Patent: Jan. 12, 2010

(54) APPARATUS AND METHOD FOR GENERATING A RANDOM NUMBER

(75) Inventors: David Meintrup, Munich (DE); Guido Stromberg, Munich (DE); Thomas Sturm, Kirchheim (DE); Annelie Stoehr, Munich (DE)

(73) Assignee: Infineon Technologies AG (DE)

( * ) Notice: Subject to any disclaimer, the term of this patent is extended or adjusted under 35 U.S.C. 154(b) by 854 days.

(21) Appl. No.: 10/978,241

(22) Filed: Oct. 29, 2004

(65) Prior Publication Data

US 2005/0286718 A1    Dec. 29, 2005

Related U.S. Application Data

(63) Continuation of application No. PCT/EP03/04285, filed on Apr. 24, 2003.

(30) Foreign Application Priority Data

Apr. 29, 2002   (DE) ................ 102 19 135

(51) Int. Cl.
  *G06F 1/02*   (2006.01)
(52) U.S. Cl. ................................. 708/250
(58) Field of Classification Search ........ 708/250–256
  See application file for complete search history.

(56) References Cited

U.S. PATENT DOCUMENTS

| | | | |
|---|---|---|---|
| 4,183,088 A | 1/1980 | Simmons | |
| 4,513,386 A | 4/1985 | Glazer | |
| 4,853,884 A | 8/1989 | Brown | |
| 5,007,087 A * | 4/1991 | Bernstein et al. | 708/250 |
| 6,271,786 B1 * | 8/2001 | Huff et al. | 342/16 |
| 6,539,410 B1 * | 3/2003 | Klass | 708/255 |
| 2005/0071400 A1 * | 3/2005 | Ribordy et al. | 708/250 |

FOREIGN PATENT DOCUMENTS

| | | |
|---|---|---|
| EP | 0 903 665 A2 | 3/1999 |
| EP | 0 981 081 A2 | 2/2000 |
| EP | 1 197 846 A2 | 4/2002 |

OTHER PUBLICATIONS

"Noise Models", http://homepages.inf.ed.ac.uk/rbf/Cvonline/LOCAL_COPIES/VELDHUIZEN/node11.html (Jan. 16, 1998).

(Continued)

*Primary Examiner*—Chat C Do
(74) *Attorney, Agent, or Firm*—Dickstein, Shapiro, LLP.

(57) ABSTRACT

Apparatus for generating a random number includes a sampler that samples a noise signal to obtain a noise signal sample, and a provider that provides at least three noise signal threshold values selected such that a first probability of the noise signal sample being between the first and second threshold values, and a second probability of the noise signal sample being between the second and third threshold values are different from each other by less than a predetermined differential value or are identical. An outputter outputs the random number such that when the noise signal sample is between the first and second threshold values, a first digit of a random number is occupied by a first logical state, whereas a second digit is occupied with a different logical state, so that a random number which is at least 2 bits wide results from one noise signal sample.

21 Claims, 8 Drawing Sheets

OTHER PUBLICATIONS

Dichtl, M. and Janssen, N.; "A High Quality Physical Random Number Generator"; Proceedings of Eurosmart Security Conference, Jun. 2000, Marseille, France, pp. 279-287.

Ralf Brederlow, "Niederfrequentes Rauschen in analogen CMOS-Schaltungen", Berlin/Munich Germany 1999, pp. 1-132, No English Translation.

* cited by examiner

APPARATUS AND METHOD FOR GENERATING A RANDOM NUMBER

CROSS-REFERENCE TO RELATED APPLICATION

This application is a continuation of copending International Application No. PCT/EP03/04285, filed Apr. 24, 2003, which designated the United States, was not published in English and is incorporated herein by reference in its entirety.

BACKGROUND OF THE INVENTION

1. Field of the Invention

The present invention relates to apparatus and methods for generating a random number as are required, for example, in cryptographic applications, e.g. SmartCards.

2. Description of Prior Art

Random numbers are required in various fields of application. Examples are simulation, test and cryptographic applications. Especially for the latter, the use of so-called pseudo random numbers is prohibitive for security reasons. Therefore, physical random number generators are often used. These are typically based on the stochastic noise of a physical system. This presents problems particularly in that an equally distributed sequence of zeros and ones is to be generated from a random physical signal as rapidly as possible, and in that the statistical properties of a signal, in particular the probability-density function, will change over time due to external influences such as temperature or pressure. Random number generators have been known from "High Quality Physical Random Number Generator", Markus Dichtl and Norbert Janssen, Proceedings of Eurosmart Security Conference, June 2000, Marseille, France, pages 279 to 287. A known random number generator includes an oscillator, a D-type flip-flop downstream from the oscillator and, at the output of the D-type flip-flop, a switch controlled by an oscillator with phase jitter. The oscillator with phase jitter, which controls the switch at the output of the D-type flip-flop, has, when the frequency of the oscillator is chosen to be at a certain ratio to the frequency of the oscillator with phase jitter, a state which is independent of the previous state, so that a high-quality noise signal is generated. For each actuation of the switch, a random bit is generated which may undergo post-processing and compression. For post-processing, a shift register with linear coupling may be employed.

Another random number generator is disclosed, for example, in EP 0 903 665 A2. Further information may also be found in the doctoral thesis of the Technische Universität Berlin, by R. Brederlow entitled "Niederfrequentes Rauschen in einer analogen CMOS-Schaltung" from 1999.

Due to differing hardware implementations, the random number generators known in the art exhibit different speeds. However, they all have in common that sampling of a random process generates merely one bit of a string of random numbers, from which a random number with a specific width, e.g. 8 bits, is then generated using any type of post-processing.

Frequently, random numbers are needed fast. To achieve this, sampling circuits, a noise source and control oscillators for the sampling circuits must be configured as fast devices, which may result in an increase in cost of the random number generator and also in an increased space requirement on a chip. This is disadvantageous in that the requirement of chip area is typically problematic, especially since with typical cryptographic applications, for example on SmartCards, the circuit designer is given a limited maximum chip area which may be used. This chip area is to accommodate not only the random number generator, but a CPU, possibly coprocessors and also, in particular, the memory. Generally, a large amount of memory is preferred, which results in the requirement of making the other components as small as possible. High-speed implementations for the random number generator therefore are prohibitive due to the large amount of space required and, last but not least, due to the high current consumption. The current consumption plays a particularly important role when contactless applications are considered, i.e. SmartCards which have no voltage supply of their own but are supplied with power by an RF field sent out, for example, from a terminal. It is immediately evident that in addition to the chip area, the power consumption of a circuit is also of great interest here.

SUMMARY OF THE INVENTION

It is an object of the present invention to provide a more efficient apparatus or a more efficient method for generating a random number.

In accordance with a first aspect, the invention provides an apparatus for generating a random number, having: a means for sampling a noise signal so as to obtain a noise signal sample; a means for providing at least three noise signal threshold values, the at least three noise signal threshold values being selected such that a first probability of the noise signal sample being between the first and second noise signal threshold values, and a second probability of the noise signal sample being between the second and third noise signal threshold values are different from each other by less than a predetermined differential value or are identical; and a means for outputting the random number having at least two digits which depend on the noise signal sample, wherein, if the noise signal sample is between the first and second noise signal threshold values, a first digit of the random number obtains a first state, and a second digit of the random number, representing a range between the second noise signal threshold value and the third noise signal threshold value, obtains a second state which differs from the first state, wherein the noise signal has a probability-density function which has been predetermined, wherein the probability of a noise signal sample being smaller than or equaling a noise signal threshold value is given by the following equation:

$$F:R \to [0,1], F(x) := \int_{-\infty}^{x} p(y) dy$$

wherein p(y) is the probability-density function of the noise signal; wherein y is a noise signal threshold value, and wherein the means for providing is configured to specify the noise signal threshold values in accordance with the following equation:

$$x_i := F^{-1}\left(\frac{i}{2^n}\right), i \in \{0, \ldots 2^n\}$$

wherein i is a control variable, wherein $F^{-1}$ is an inverse function of the function F, and wherein $x_i$ is the noise signal threshold value sought.

In accordance with a second aspect, the invention provides a method for generating a random number, the method including the following steps: sampling a noise signal so as to obtain a noise signal sample; providing at least three noise signal threshold values, the at least three noise signal threshold values being selected such that a first probability of the noise signal sample being between the first and second noise signal threshold values, and a second probability of the noise signal sample being between the second and third noise signal threshold values are different from each other by less than a predetermined differential value or are identical; and outputting the random number having at least two digits which depend on the noise signal sample, wherein, if the noise signal sample is between the first and second noise signal threshold values, a first digit of the random number obtains a first state, and a second digit of the random number, representing a range between the second noise signal threshold value and the third noise signal threshold value, obtains a second state which differs from the first state, wherein the noise signal has a probability-density function which has been predetermined, wherein the probability of a noise signal sample being smaller than or equaling a noise signal threshold value is given by the following equation:

$$F: R \to [0, 1], F(x) := \int_{-\infty}^{x} p(y) dy$$

wherein p(y) is the probability-density function of the noise signal; wherein y is a noise signal threshold value, and wherein the step of providing includes specifying the noise signal threshold values in accordance with the following equation:

$$x_i := F^{-1}\left(\frac{i}{2_n}\right), i \in \{0, \ldots 2^n\}$$

wherein i is a control variable, wherein $F^{-1}$ is an inverse function of the function F, and wherein $x_i$ is the noise signal threshold value sought.

In accordance with a third aspect, the invention provides an apparatus for generating a binary random number, having: a means for sampling a noise signal to obtain a noise signal sample; a means for providing at least $2^n+1$ noise signal threshold values, n being higher than or equal to 2, wherein the noise signal threshold values define $2^n$ ranges for a noise signal sample, the $2^n+1$ noise signal threshold values being selected such that probabilities of the noise signal sample being in one of the $2^n$ ranges differ from each other by less than a predetermined differential value or are identical; and a means for outputting the binary random number having n bits which depend on the noise signal sample, the n bits of the binary random number being determined such that each bit combination of the n bits of the binary random number is uniquely associated with one of the $2^n$ ranges, wherein the noise signal has a probability-density function which has been predetermined, wherein the probability of a noise signal sample being smaller than or equaling a noise signal threshold value is given by the following equation:

$$F: R \to [0, 1], F(x) := \int_{-\infty}^{x} p(y) dy$$

wherein p(y) is the probability-density function of the noise signal; wherein y is a noise signal threshold value, and wherein the means for providing is configured to specify the noise signal threshold values in accordance with the following equation:

$$x_i := F^{-1}\left(\frac{i}{2_n}\right), i \in \{0, \ldots 2^n\}$$

wherein i is a control variable, wherein $F^{-1}$ is an inverse function of the function F, and wherein $x_i$ is the noise signal threshold value sought.

In accordance with a fourth aspect, the invention provides a method for generating a binary random number, the method including the following steps: sampling a noise signal to obtain a noise signal sample; providing at least $2^n+1$ noise signal threshold values, n being higher than or equal to 2, wherein the noise signal threshold values define $2^n$ ranges for a noise signal sample, the $2^n+1$ noise signal threshold values being selected such that probabilities of the noise signal sample being in one of the $2^n$ ranges differ from each other by less than a predetermined differential value or are identical; and outputting the binary random number having n bits which depend on the noise signal sample, the n bits of the binary random number being determined such that each bit combination of the n bits of the binary random number is uniquely associated with one of the $2^n$ ranges, wherein the noise signal has a probability-density function which has been predetermined, wherein the probability of a noise signal sample being smaller than or equaling a noise signal threshold value is given by the following equation:

$$F: R \to [0, 1], F(x) := \int_{-\infty}^{x} p(y) dy$$

wherein p(y) is the probability-density function of the noise signal; wherein y is a noise signal threshold value, and wherein the step of providing includes specifying the noise signal threshold values in accordance with the following equation:

$$x_i := F^{-1}\left(\frac{i}{2_n}\right), i \in \{0, \ldots 2^n\}$$

wherein i is a control variable, wherein $F^{-1}$ is an inverse function of the function F, and wherein $x_i$ is the noise signal threshold value sought.

The present invention is based on the findings that a random number having two or more digits may be generated from sampling a noise signal by taking advantage of the stochastic properties of the random process. This is made possible by the fact that the domain of definition of the probability-density function of a random process, such as the shot noise of a diode or an ohmic resistor making thermal noise, or a controllable oscillator controlled by a noise signal, is divided into domains of equal probability so as to occupy one or several digits of the random number, depending on whether a noise signal sample is present in one of the several domains.

Depending on the embodiment, the digits of the random number are interdependent and are thus no random bits in the binary case. The numbers defined by the independent digits, however, are random numbers with maximum information. In applications where random numbers are needed whose number of digits is equal to the number of digits of the random bits, the random numbers with interdependent digits may suffice. For this purpose it is sufficient to divide the domain of definition of the probability-density function into at least two domains so as to generate a random number with two—interdependent—digits, the random number 01 being output, for example, when the random number is in the first domain, and the random number 10 being output when the number is in the second domain.

However, in applications where mutually independent "digits" of the random number—that is, in terms of information theory, genuine random bits—are required, the domain of definition of the probability-density function must be divided into at least 4 domains (or 8, 16, 32, . . . domains) to generate a random number with random bits which are mutually independent in terms of information theory, the random numbers 00, 01, 10, 11 meaning that the random number is in the first, second, third and fourth domains, respectively. Since the digits are mutually independent, relatively long random numbers with more than two digits may be readily composed from these random numbers having at least two digits.

If two domains of the probability-density functions having the same probability, i.e. whose areas are identical below the probability-density function, already exist, a random number with two—dependent—digits, i.e. with two bits in the binary case, may already be generated.

If the probability-density function is divided into a larger number of domains of equal probability, a random number may be generated which comprises a considerably larger number of digits per noise signal sampling, the number of dependent digits always being larger than the number of independent digits.

Due to the fact that a random number having two or more digits is generated from a noise signal sampling process, the speed of the noise signal generator may be doubled or multiplied compared to a known noise signal generator, wherein only one bit is generated per noise signal sampling process.

So that the random numbers generated are indeed equally distributed, it is preferred that the noise signal threshold values be set such that the probabilities of a noise signal sample being between two adjacent noise signal threshold values are, for various threshold values, are different from each other by less than a predetermined differential value, or are preferably even identical.

To this end, in a preferred embodiment of the present invention, a portion-by-portion or continuous adaptation of the noise signal threshold values is effected to be able to compensate temperature, pressure and other ambient variations of the entire circuits and, in particular, of the noise signal source.

Depending on the case of application, it is further preferred to code and/or post-process the random number having the two or more—dependent—digits using an encoder so as to generate an encoded random number having—mutually independent—random bits in terms of information theory. By withdrawing redundancy from the random number having the dependent digits, encoded random numbers are generated whose digits are mutually independent.

In other words, the encoding is performed so as to achieve equal-probability distribution not only with a view to the random number on the whole, but also to achieve a statistical equal-probability distribution with regard to the individual digits of the random number.

BRIEF DESCRIPTION OF THE DRAWINGS

Preferred embodiments of the present invention will be explained below in detail with reference to the accompanying figures, in which.

DESCRIPTION OF PREFERRED EMBODIMENTS

Figure 1:
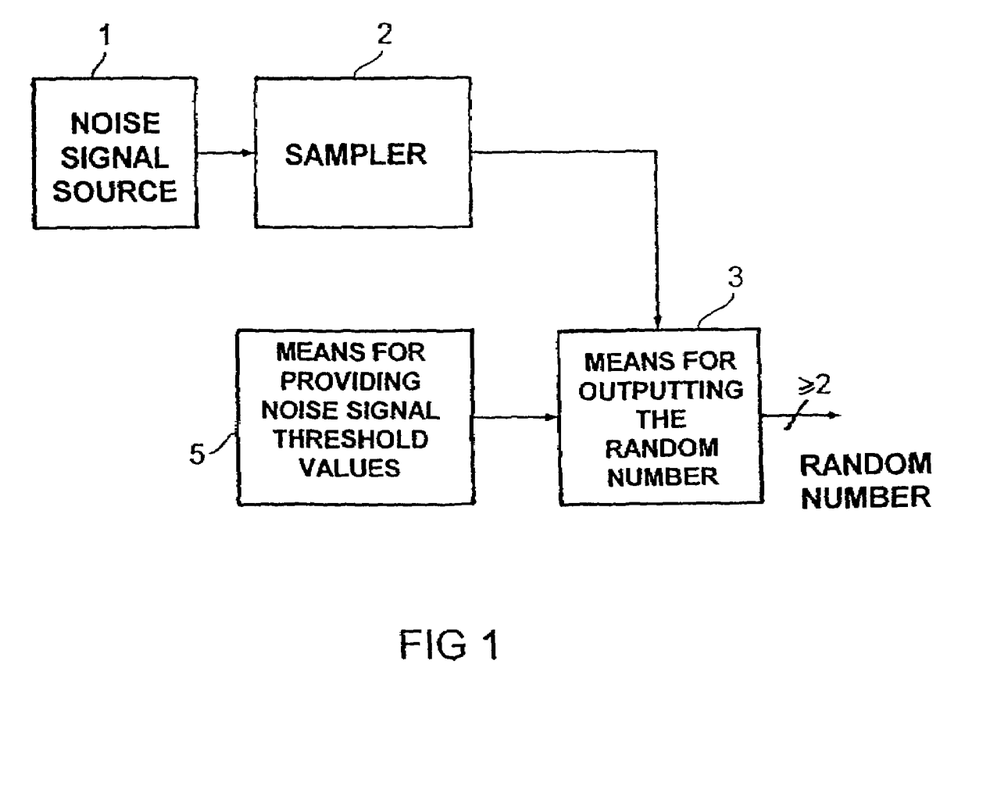
FIG. 1 shows a basic block diagram of the inventive apparatus for generating a random number.
Figure 2A:
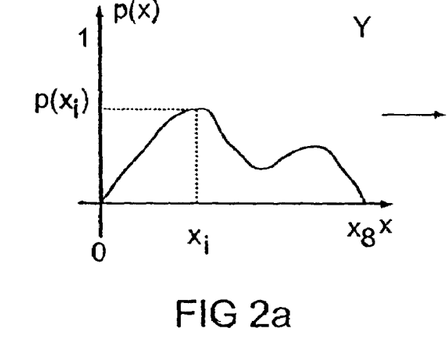
FIG. 2a shows an exemplary probability-density function of a noise signal.

FIG. 1 shows a noise signal source 1 with a specific probability-density function p(x) which will be explained in more detail with reference to FIGS. 2a and 2b. A noise signal output from the noise signal source 1 is fed into a sampler 2 typically comprising a sample-and-hold circuit and a downstream quantizer, so as to supply, at the output of the sampler 2, a digital quantized value to a means 3 for outputting a random number. The means 3 is further controlled by a means 5 for providing noise signal threshold values. The means 5 for providing noise signal threshold values is configured to provide at least three noise signal threshold values, the at least three noise signal threshold values being selected such that a first probability of a noise signal sample provided by the sampler 2 being between the first and second noise signal threshold values, and a second probability of the noise signal sample being between the second and third noise signal threshold values differ by less than a predetermined differential value, or are identical.

The means for outputting the random number having at least two digits which depend on the noise signal sample is configured to occupy, if a noise signal sample is between the first and second noise signal threshold values, a first digit of the random number with a logical state differing from a logical state with which a second digit of the random number is occupied if the noise signal sample is between the second and third noise signal threshold values. The use of three noise signal threshold values thus results in two ranges in which the noise signal sample may be found, to be precise a first range between the first noise signal threshold value and the second noise signal threshold value, and a second range between the second noise signal threshold value and the third noise signal threshold value. If the noise signal sample is in the first range, a first digit of the random number is occupied, for example, by a logical "1", and a second digit—dependent on the first digit—of the random number is occupied by a logical "0", since the noise signal sample is not in the second range, which is represented by the second digit of the random number. Each sampling process performed by the sampler 2 with the noise signal output from the noise signal source 1 therefore leads to a 2-bit random number, however both bits of the random number being mutually dependent due to the redundancy involved.

In the following, the nature of the noise signal source 1 of FIG. 1 will be dealt with reference to FIGS. 2a and 2b. It is assumed that the noise signal source provides a stochastic signal Y having a continuous density function p(x). The density function p(x) is now divided, in accordance with the invention, into at least $2^n$ intervals or ranges, n being an integer and being larger than or equal to 1. For n=1, random numbers having two or more digits may be obtained, the digits being mutually dependent, however.

For four or more ranges, that is n=2, 3, 4 . . . , random numbers with mutually independent digits may be generated, each bit combination of the independent digits having precisely one range associated with it. For 4 ranges, the random number thus has 2 genuine random bits. For 8 ranges, 3 genuine random bits may be obtained per sampling. For 16 ranges, 4 genuine random bits may be obtained per sampling, etc.

This division is performed such that the areas enclosed by the points of division $x_i$ below the graph p(x) are equal in size. Such a division for the exemplary probability-density function p(x) of FIG. 2a is shown in FIG. 2b. The areas below the probability-density function p(x) between two adjacent noise signal threshold values $x_i$ and $x_{i+1}$ are preferably identical, i.e. $A_i = A_{i+1}$ for all i. The areas below the probability-density function p(x) between two noise signal threshold values are obtained by integrating the probability-density function p(x) from a noise signal threshold value $x_i$ to the adjacent noise signal threshold value $x_{i+1}$. The noise signal threshold values thus are to be determined such that the ranges delimited by two adjacent noise signal threshold values have areas equal in size. The points of division and/or noise signal threshold values are also referred to as $(i/2^n)$ quantiles. If a random variable $\tilde{Y}$ is defined by associating a number i with each interval between two points of division $x_i$ and $x_i+1$, an equal-probability distribution to $\{0, \ldots 2^{n-1}\}$ is obtained. This may be expressed by the following equation:

$$P(\tilde{Y} = i) = P(x_i \leq Y \leq x_{i+1}) = \frac{1}{2_n} \text{ for all } i \in \{0, \ldots 2^n - 1\} \quad (1)$$

By means of this method, a realization on the discrete set $\{0, \ldots 2^{n-1}\}$ is obtained from each signal. However, since same has a binary representation which is n bits long, each individual measurement provides n bits. Thus the method is n times faster than a direct generation of bits.

In addition it shall be noted that there is no theoretical limit to the magnitude of the number n. In practice, it is limited by accuracy of measurement, expense and resolution of the physical system. Moreover, the inventive concept works for each continuous stochastic signal, regardless of the form of the associated density function.

One advantage of the present invention is that the generation of bits is faster, by the factor of n, than a bit-by-bit generation. There is no theoretical limit to n.

A further advantage of the present invention is that the method is applicable independently of the concrete form of the density function of the stochastic signal.

A further advantage of the present invention is that the points of division and/or noise signal threshold values required are either determined in advance, i.e. are provided by the means for providing noise signal threshold values, or may be adapted to time-related variations of the distribution function using adaptive methods.

The noise signal source may be of one of the forms set forth above, or may be of any form providing a stochastic signal with a probability-density function. The sampler may be of any desired construction, as long as it provides, on its output side, a signal of an accuracy that it is possible to decide whether or not the noise signal sample, i.e. an output value of the noise signal source at any desired moment of sampling, is between two noise signal threshold values.

As has already been set forth, as few as three noise signal threshold values suffice to generate a 2-bit random number (having mutually dependent digits) from a noise signal sampling process. In the example of FIG. 2b, the first noise signal sample would be the value $x_0$, the second noise signal sample would be the value $x_4$, and the third noise signal sample would be the value $x_8$. Alternatively, use may also be made of three adjacent noise signal threshold values not including the starting point $x_0$ or the terminal point $x_8$, such as the three noise signal threshold values $x_2$, $x_3$ and $x_4$, however only noise signal samples between $x_2$ and $x_4$ leading to random numbers. Alternatively, use may also be made of ranges which are not coherent, so that an invalid range exists which is adjacent to a valid range. If a sample is found in such an invalid range, no random number will be output for this sample. An invalid range could be used, for example, to "blank out" a problematic location in the probability-density function of a physical noise source.

It shall be pointed out that when using three noise signal threshold values, the information as to whether the noise signal sample is in a range between the two lower noise signal threshold values, or in the other range, that is between the upper noise signal threshold values, is detected. Even though the two digits are dependent on each other due to the redundancy in the 2-bit random number, a sequence of such, for example, 2-bits, random numbers comprises stochastic distribution.

In a preferred embodiment of the present invention it is preferred to work with more than three noise signal threshold values. To this end, reference is made to FIG. 3. FIG. 3 shows a detailed implementation of the means 3 for outputting a random number. The means 3 for outputting a random number includes various threshold-value discriminators 3a, 3b, 3c, which, in the preferred embodiment shown in FIG. 3, do not include lowest threshold value $x_0$ of FIG. 2b and the highest threshold value $x_8$ of FIG. 2b, but include merely the threshold values between the lowest and the highest threshold values. The threshold-value discriminators are configured to output a logically high signal, such as a "1" bit, if a noise signal sample provided by the A/D converter 2 is larger than the threshold, and to output a logical "0" if the noise signal sample is smaller than the noise signal threshold value which is either provided by the means 5 in a fixedly stored manner, or, as is explained with reference to FIGS. 4, 5, 6 and 7, is provided in an adaptive manner.

Figure 2B:
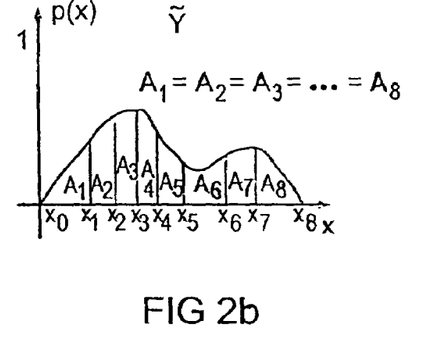
FIG. 2b shows a representation of the division of the range of values of the probability-density function of FIG. 2a into ranges of equal probability.
Figure 3:
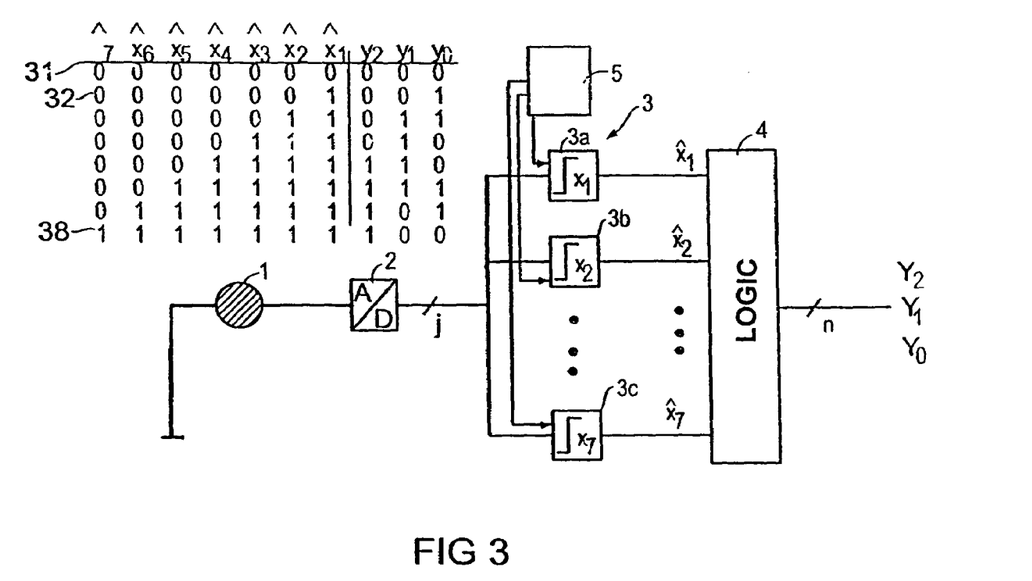
FIG. 3 shows an apparatus for generating a random number in accordance with a first embodiment of the present invention with a truth table for the encoder logic.

If, for example, a noise signal sample is in the range between $x_0$ of FIGS. 2b and $x_1$ of FIG. 2b, all threshold-value gates will output a logical "0", since the noise signal sample "triggers" none of the threshold-value gates of FIG. 3, which means, in other words, that the noise signal sample does not exceed any of the noise signal threshold values. This case corresponds to a first line 31 of the truth table, represented in FIG. 3, for an encoder logic 4, which is dealt with below. If the noise signal sample of the A/D converter 2 is between the noise signal threshold value $x_1$ and the noise signal threshold value $x_2$, however, the first gate 3a will output a logical "1", whereas all the other gates will output logical "0s". This corresponds to the second line 32 of the truth table for FIG. 3. If the noise signal sample is above the highest noise signal threshold value $x_7$, however, this would correspond to the eighth line 38 of the truth table, wherein all threshold-value gates 3a, 3b and 3c output logical "1s".

In the left-hand area of the truth table, that is downstream from the threshold-value discriminators in the circuit of FIG. 3, there are random numbers having mutually dependent digits, whereas random numbers having mutually independent digits, which are genuine random bits in terms of information theory, may be found in the right-hand area. These genuine random bits may be used to generate, using many noise signal samples, e.g. a 512-bits random number required in the key generation of, for example, the RSA algorithm. To this end, only 103 samples would be required with 32 ranges (that is five random bits per sampling operation), as opposed to 512 sampling operations that are required if precisely one random bit is generated per sampling operation.

It shall be pointed out that in the embodiment shown in FIG. 3, in order to generate the random numbers, use is made of threshold-value gates which assign only one bit to the fact whether or not a noise signal sample is above or below the threshold value, i.e. is in the first or the second range. In order to generate, in such a case, a random number having at least two—dependent—digits at the output of the means 3 using threshold-value gates, at least two threshold-value gates, i.e. four noise signal threshold values in total, must be used, since the lowest noise signal threshold value $x_0$ of FIG. 2b and the highest noise signal threshold value $x_8$ of FIG. 2b would have to be used additionally. In this case, in which only two noise signal threshold values for $x_1$, $x_2$ are used, the noise signal threshold value $x_1$ would be between the noise signal threshold values $x_2$ and $x_3$ of FIG. 2b, and the second noise signal threshold value $x_2$ would be between the noise signal threshold values $x_5$ and $x_6$ of FIG. 2b, to be precise also on the previously mentioned precondition that the areas between the noise signal threshold value and the respective boundary values $x_0$ and $x_8$ be identical and also be identical to the areas between the two noise signal threshold values determining the gates 3a, 3b. In contrast, at least three threshold-value gates, which are able to distinguish between four ranges in the probability-density function, would be required for generating genuine random bits.

Thus, the noise signal source 1 of FIG. 3 generates a stochastic signal, wherein, as has been set forth, an electronic device such as a resistor or a transistor may be used.

This analog signal is discretized in $2^j$ stages by means of the A/D converter 2 and is then processed by means of the threshold-value gates, as has been set forth. For practical reasons, only the internal threshold values are used, as has been explained, i.e. the threshold values for the minimum and maximum amplitudes are not required. It shall be pointed out that the functionality of the threshold values may be integrated with the A/D converter 2 in a single component.

Depending on the magnitude of the sampled noise value of the noise source, a random number, which is a $2^n-1$ dimensional binary vector, results at the outputs of the threshold-value gates. In preferred embodiments of the present invention it is preferred to encode this redundant vector (left-hand half of the truth table in FIG. 3) and to map it to an n-dimensional output vector. To this end, use is made of a logic means 4 functioning, in principle, as an encoder. In the preferred embodiment shown in FIG. 3, the logic means 4 comprises the truth table represented in FIG. 3 so as to map and/or re-encode a 7-bits random number having dependent digits into a 3-bits encoded random number having genuine random bits. Thus a vector of random bits, which represents an encoded random number, is present at the output of logic 4.

For implementing the random numbers having dependent digits and being present at the input of logic 4, it is often preferred to cause redundancy withdrawal by the encoder 4, which is also referred to as "logic" in FIG. 2 and the further figures, so as to obtain the genuine random bits.

It shall be pointed out that the function of the threshold-value gates and the function of the logic means 4 may also be combined in one single device.

Alternatively, it is not necessarily required to perform a threshold-value gate decision and subsequent encoding. The association of two or more random bits with a range may be performed in any manner desired in accordance with the invention, as long as the n bits of the binary random number are determined such that each bit combination of the n bits of the binary random number is uniquely associated with one of the $2^n$ ranges.

The logical function which must be implemented by the encoder 4 may be represented, for example, by a ROM table comprising the truth table of FIG. 3. If the threshold values $x_i$ are selected such that the $x_i$ correspond to the $(i/2^n)$ quantiles required for the equal-probability distribution, the association of the $2^n-1$ binary outputs of the threshold-value gates with the n-dimensional output vector of the logical function is arbitrary, but preferably bijective.

A logical function having the properties required if given, for example, by means of an adder. If $x_i$ is smaller than $x_{i+1}$, the logical function may also be implemented, for example, in the form of a so-called priority encoder. Due to the redundancy in the output vector of the threshold-value gates, a number of further logical functions are possible. For example, if the following function is selected for the output bits $Y_0, \ldots, Y_{n-1}$:

$$y_{n-i} = \bigoplus_{q=2(n-1)\pm\ldots\pm 2^{(n-i)}-1} \hat{x}_{q'} \quad i = 1, \ldots, n \qquad (2)$$

a suitable unique function results as well. Here, $\oplus$ denotes the addition modulo 2, and $\hat{x}_q$ denotes the binary output of the threshold-value gate with the threshold value $x_1$.

For n=3, the following applies:

$$y_2 = \hat{x}_3 \, y_1 = \hat{x}_5 \oplus \hat{x}_1 \, y_0 = \hat{x}_6 \oplus \hat{x}_4 \oplus \hat{x}_2 \oplus \hat{x}_0 \qquad (3)$$

This function corresponds to the truth table shown in FIG. 3.

It shall be pointed out that the suitable choice of the threshold values $x_i$ is significant for the quality of the equal-probability distribution of the random numbers. If the density function p(x) of FIG. 2a of the stochastic signal is constant in time and sufficiently well known a priori, these values may be calculated and set a priori. If the density function p, however, is unknown, or changes over time, it is preferred to track, i.e.

adapt, the threshold values. Adaptation of the threshold values makes sense even if implementation inaccuracies, for example of the analog/digital converter, are to be compensated for. As will be explained below, it is possible to determine the optimum noise signal threshold values automatically even when the probability-density function p(x) is constant in time, but not known a priori. In that case, the means 5 for calculating the noise signal threshold values must initially determine the noise signal threshold values even if the probability-density distribution is unknown, but constant-in-time, so as to be able to provide optimally set threshold values after a number of training passes.

The a-priori choice of the threshold values $x_i$ occurs as follows in an analytically or numerically known distribution function which has been obtained by measurement, for example. If F is a given distribution function of the random variable Y with a constant density function p, the following connection applies:

$$F:R \to [0, 1], F(x) := \int_{-\infty}^{x} p(y)dy \qquad (4)$$

In this case, the points of division are to be selected for an equal-probability distribution to $\{0, \ldots, 2^{n-1}\}$:

$$x_i := F^{-1}\left(\frac{i}{2_n}\right), i \in \{0, \ldots 2^n\} \qquad (5)$$

If a new random variable $\overline{Y}$ is defined as described above, same is equally distributed to $\{0, \ldots 2^{n-1}\}$.

In the following, various possibilities of adaptively setting the noise signal threshold values of the means 3 for outputting the random numbers having at least two digits will be dealt with reference to FIGS. 4, 5, 6, and 7.

Figure 4:
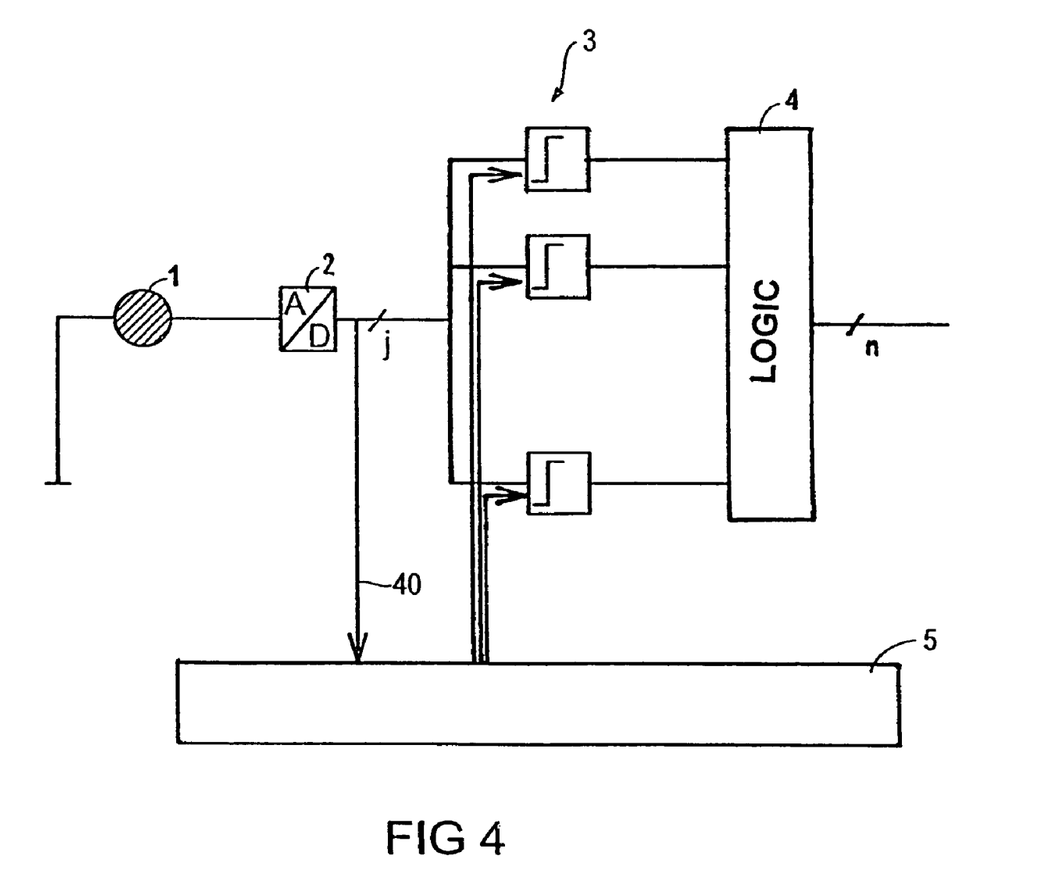
FIG. 4 shows an apparatus for generating a random number in accordance with a further embodiment of the present invention with tracking of the noise signal threshold values.
Figure 5:
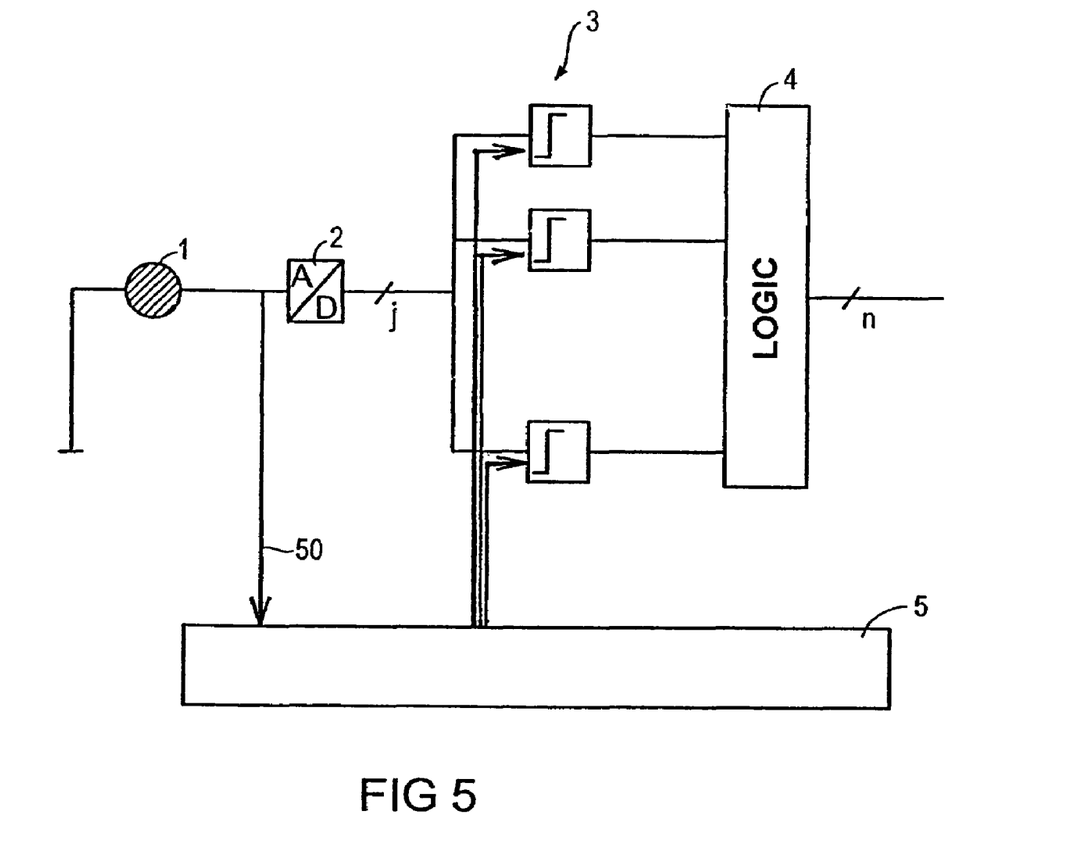
FIG. 5 shows an apparatus for generating a random number in accordance with a further embodiment of the present invention using adaptive tracking of the noise signal threshold values.
Figure 6:
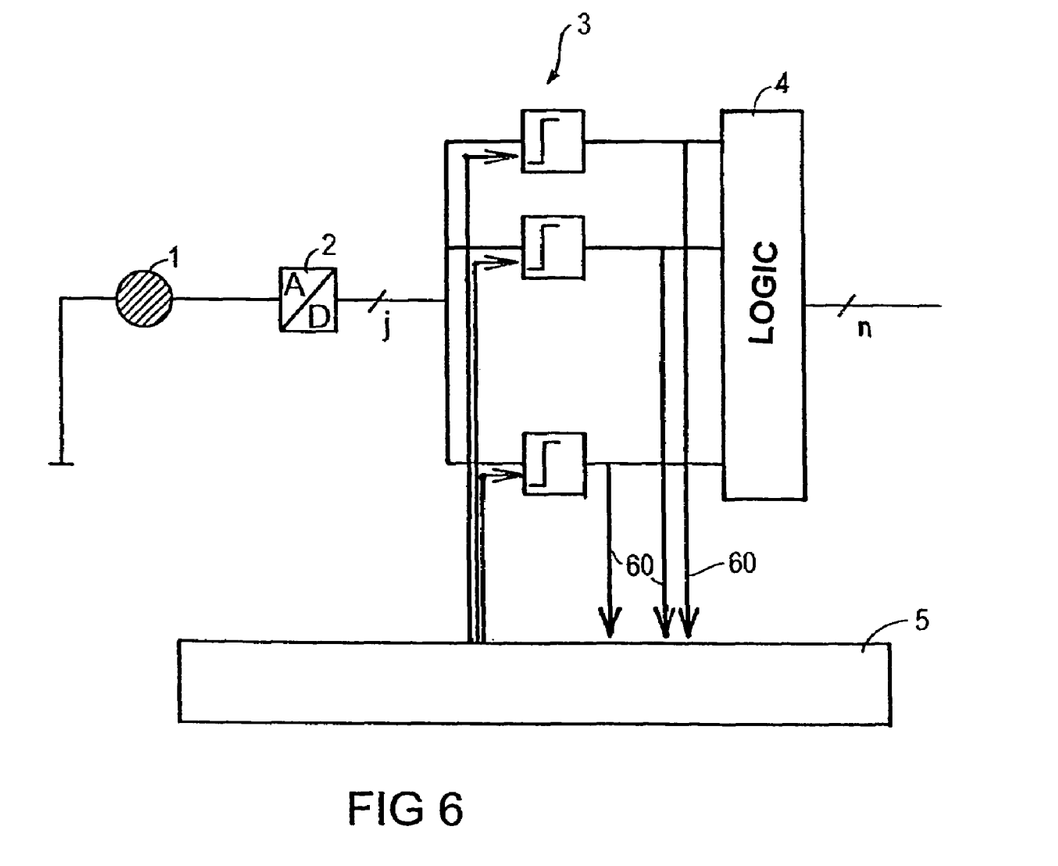
FIG. 6 shows a further embodiment of the present invention using adaptive tracking of the noise signal threshold values in accordance with a further embodiment of the present invention.
Figure 7:
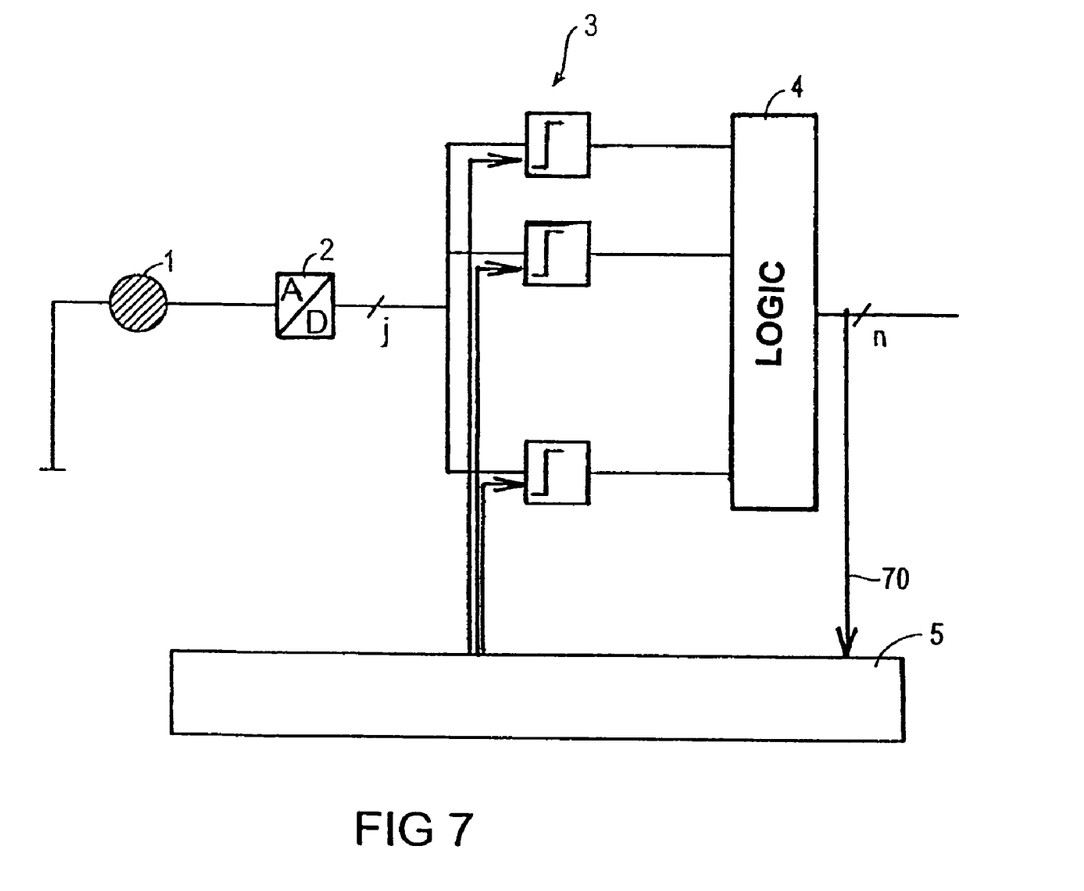
FIG. 7 shows an apparatus for generating a random number using adaptive tracking of the noise signal threshold values in accordance with a further embodiment of the present invention.

In the embodiment shown in FIG. 4, discretized output values of the A/D converter are evaluated for tracking the noise signal threshold values, as represented by an arrow 40. Alternatively, as is represented in FIG. 5, the noise signal values at the output of the noise source may be considered and evaluated directly, as is represented by an arrow 50. Alternatively, the random numbers at the output of the means 3 may be used, as is represented by line 60 in FIG. 6. Alternatively, the encoded random numbers at the output of the logic means 4 may be considered, as is represented in FIG. 7 by an arrow 70. Alternatively, any combinations desired of the possibilities represented in FIGS. 4, 5, 6, and 7 may be employed. To this end, several observed values are read into the means 5 for providing the noise signal threshold values, and are processed. Alternatively, a tracking of the noise signal threshold values may be achieved if only a currently observed value is read in and processed. The means 5 then forms an estimate for the optimum threshold values $x_i$ and forwards these to the threshold-value gates, as can be seen from the Figs.

Figure 8:
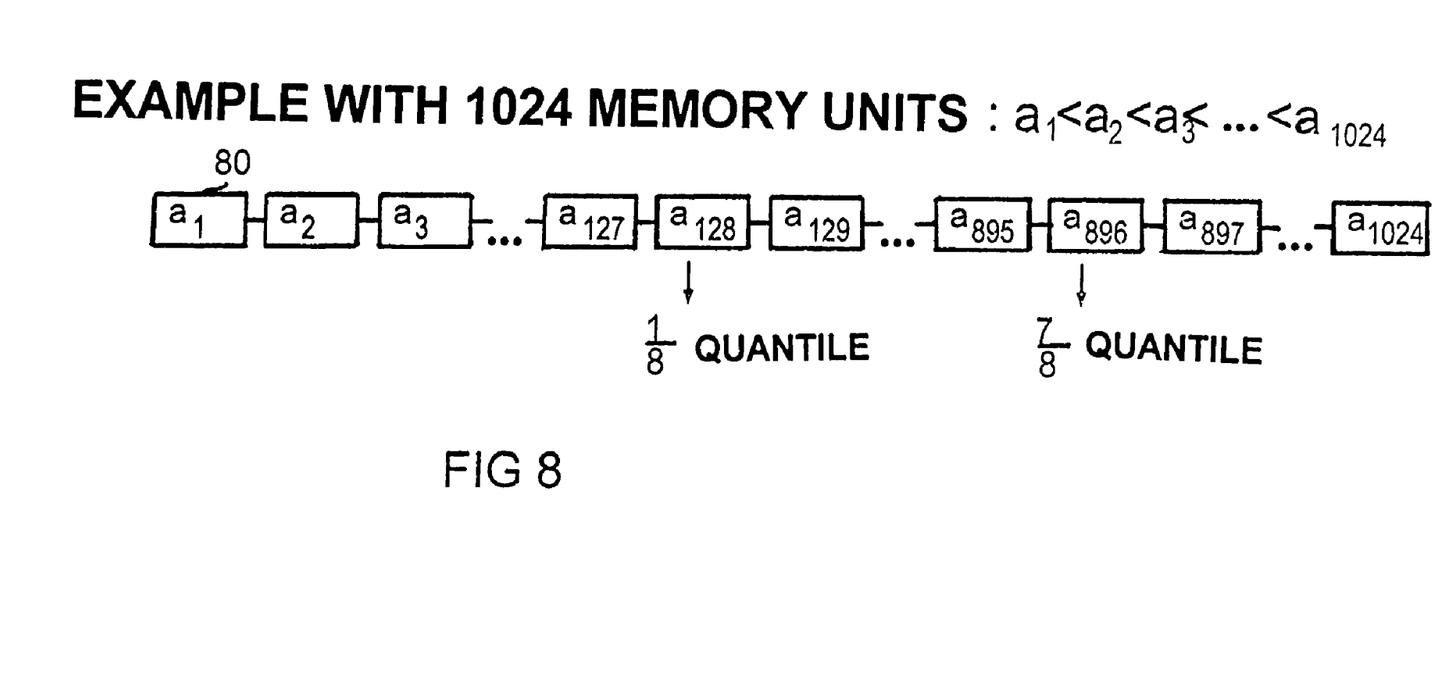
FIG. 8 shows an exemplary implementation for the means for providing the noise signal threshold values with adaptive setting.

One possibility of approximating the $i/(2^n)$ quantiles, i.e. the noise signal threshold values, of the distribution results from determining the statistical $i/(2^n)$ quantiles of the measurements. This may be effected, for example, by storing the noise data such that they are sorted in an ascending order, as may be seen from FIG. 8. Subsequently the respective quantile may be found by counting. For example, FIG. 8 shows 1024 memory units 80 arranged in an ascending order. For applying the concept shown in FIG. 8, 1024 noise signal samples, random numbers, etc. must initially be detected and sorted into the 1024 memory units by size, to be precise in an ascending order. If the 1024 memory units are occupied, the ⅛ quantile, i.e. the noise signal threshold value x of FIG. 2b, is in the memory cell $a_{128}$, for example, whereas the ⅞ quantile, that is the noise signal threshold value $x_7$ of FIG. 2b, is in the memory cell $a_{896}$. An advantage of the concept shown in FIG. 8 is that it may be used for immediate tracking once the 1024 memory units have been filled. If 1024 noise signal values are detected and sorted in, and if the 1025th value is obtained, the latter must be sorted into a memory unit 80, so that a next memory unit down has a smaller value, and so that a next memory value up has a higher value. To this end, the value which has been inserted first, that is the oldest value, is discarded, and the memory element sequence is re-sorted using the new value.

If a value different from the one before ends up in a memory unit determining a quantile, the respective noise signal threshold value in the respective threshold-value gate of the means 3 is changed to the newly sorted-in value. What is essential about the concept described in FIG. 8 is that a fast sorting-in algorithm is used.

In the following, an adaptive method wherein an estimate for the threshold values is obtained by observing the random numbers generated will be presented as an alternative option. To this end, an interval [a, b] shall be given for which any desired, but thereafter fixed γ quantile is to be determined from the set [0,1]. X(1) from the set [a, b] denotes the threshold value found in the $l^{th}$ step, and $R_c(l)$ denotes a set of realizations of the random process of the power c, c being a natural number.

The two following equations indicate the number of elements from $R_c(l)$ which are higher and smaller, respectively, than the threshold value x(1):

$$A(l):=|\{i \in R_c(l)|i \leq x(l)\}| \text{ and}$$

$$B(l):=|\{i \in R_c(l)|i > x(l)\}| \qquad (6)$$

The algorithm has the following flow, c being fixedly selected:

1: select x(1)ϵ[a, b] as desired
2: select αϵR, α>0 as desired
3: l←0
4: repeat
5: l←l+1
6: $R_c(l)$←c realizations of the random process
7: A(l)←|{iϵ$R_c$(l)|i≦x(l)}|
8: B(l)←|{iϵ$R_c$(l)|i>x(l)}|
9: x(l+1)←x(l)+(γB(l)−(1−γ)A(l))/β(l)
10: sufficiently good up to adaptation The factor β(1) may be selected to accelerate the convergence. If $R_c$(1) is independent and if β(l)=1, the convergence towards the γ quantile with a probability of 1 may be proved mathematically. The truncation condition in line 10 may be realized, for example, by several comparisons of A(l) and B(l) or may be replaced by a fixed number of iteration cycles. The algorithm may be used simultaneously for all quantiles required (e.g. γ=i/$2^n$, i=1, . . . , $2^n$−1).

It is further recommended to reset the step variable 1 to a smaller value after a specified number of iteration cycles, so that a new correction and/or adaptation takes place. As has already been explained, the algorithm may be used simultaneously for all quantiles required (for example γ=i/$2^n$, i=1, . . . , $2^{n-1}$).

In addition, the algorithm described leads to an automatic setting of the noise signal threshold values even with unknown probability-density distribution p(x).

This also applies to the concept described in FIG. 8, whereas here, too, the noise signal threshold values have been automatically set as required after a certain training phase during which random numbers should not be output.

If the algorithm is activated during the generation of the random numbers, the case c=1 is particularly advantageous with regard to one specific implementation.
1: l←l+1
2: i←a realization of the random process
3: if i>x(l) then
4: x(l+1)←x(l)+γ/β(l) (increment)
5: else
6: x(l+1)←x(l)−(1−γ)/β(l) (decrement)
7: end if In the latter scenario, the case of $\beta(l)=2^{j-r}$, wherein r is a natural number or 0, and $2^j$ is quantizing stages in the A/D converter of the sampler, is particularly interesting with regard to one specific implementation.

If one considers, for example, the ¼ quantile, the loop of the algorithm reads as follows:
1: l←l+1
2: i←a realization of the random process
3: if i>x(l) then
4: $x(l+1) \leftarrow x(l)+2^{r-i-2}$ (increment)
5: else
6: $x(l+1) \leftarrow x(l)-3 \cdot 2^{r-j-2}$ (decrement)
7: end if If one further considers the ½ quantile, the algorithm reads as follows:
1: l←l+1
2: i←a realization of the random process
3: if i>x(l) then
4: $x(l+1) \leftarrow x(l)+2^{r-j-1}$ (increment)
5: else
6: $x(l+1) \leftarrow x(l)-2^{r-j-1}$ (decrement)
7: end if If one finally considers the ¾ quantile, the loop in the algorithm reads as follows:
1: l←l+1
2: i←a realization of the random process
3: if i>x(l) then
4: $x(l+1) \leftarrow x(l)+3 \cdot 2^{r-j-2}$ (increment)
5: else
6: $x(l+1) \leftarrow x(l)-2^{r-j-2}$ (decrement)
7: end if In the following, reference will be made to FIG. 9 to explain an implementation, in terms of circuitry, of the simplified algorithm by way of example for the center quantile, i.e. the ½ quantile $x_4$ of FIG. 2b, and the case n=2, r=1. The means for providing the noise signal threshold value $x_4$ includes a register 90, an adder 91, a calculating unit 92 as well as two inputs 93 and 94, one of which supplies the value $+2^{-j}$ to the adder 92, whereas the other supplies the value "$-2^{-j}$" to the adder 92. The entire circuit block for the center noise signal threshold value $x_4$ is denoted with the reference numeral 6 in FIG. 9. In particular, the currently employed threshold value is held in the register 90 and incremented or decremented, depending on the state of the current threshold-value decision. The entire block 6 is actuated by a control logic 7 via an enable line "en1" 95 when the respective threshold value $x_4$ is to be adapted. The same blocks 8, 9 exist in an analogous implementation for the other two threshold values. The precondition for their activation, however, is that the current noise value is in the interval]−∞, $x_1$[and/or]$x_1$, +∞[. For this reason, the control logic is additionally supplied with the output signal of the threshold-value gate with the threshold value $x_4$, as may be seen from FIG. 9. It shall be pointed out that other quantiles than the center quantile may also be determined using the respective proportional γ value in line 3 of the above algorithm.

It shall be pointed out that any alternatives desired may be configured for monitoring the statistics of the respective random numbers and for tracking the respective noise signal threshold values.

Figure 9:
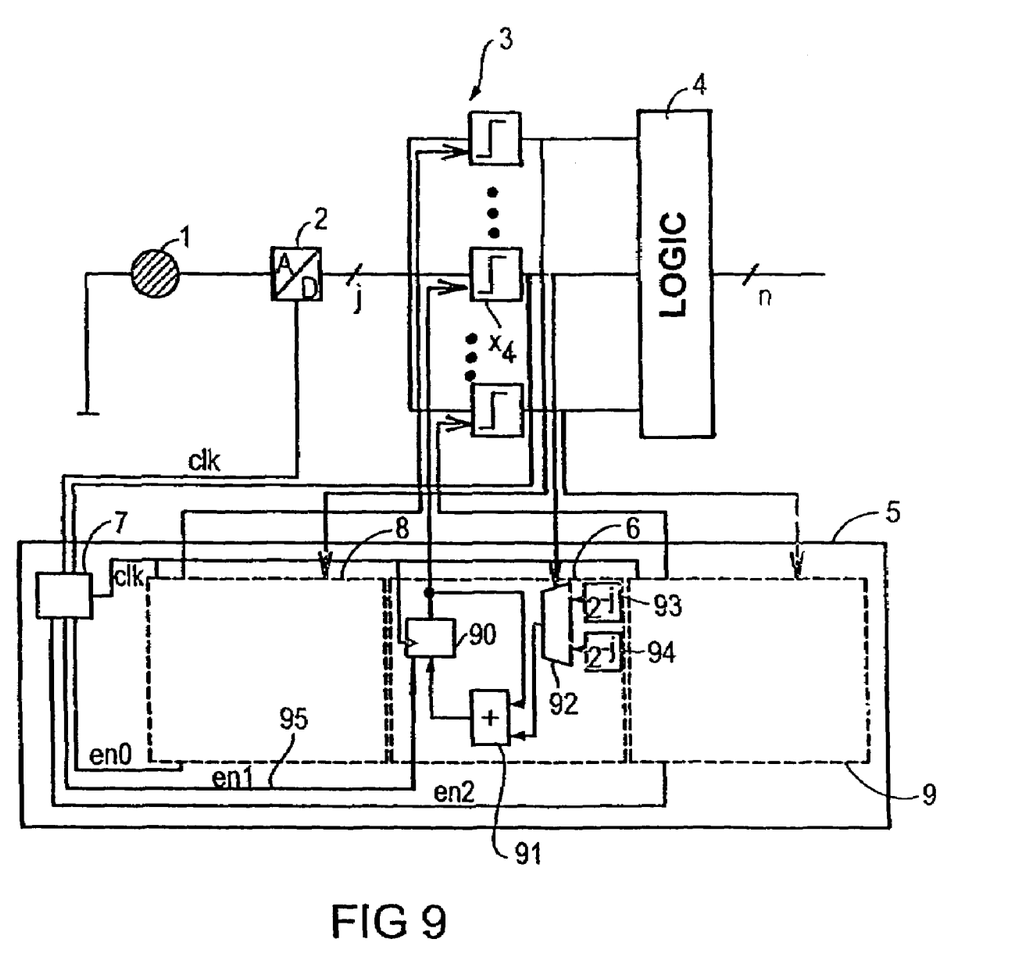
FIG. 9 shows an alternative implementation of the means for providing the noise signal threshold values with adaptive tracking.

For each newly detected value, the embodiment illustrated in FIG. 9 performs an adaptation which is favorable to realize in terms of circuit engineering. This is because the calculating unit 92 is to be configured merely as a simple comparator to implement line 3 of the latter algorithm and to perform, subsequently, an incrementation and/or decrementation, preferably after performing a weighting with an iteration variable, which is not shown in FIG. 9. Thus, the new noise signal threshold value is calculated from the old noise signal threshold value $x_4$ using the adder 91.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for generating a random number, comprising:

a noise source configured to generate a noise signal;

an analog-to-digital converter, coupled to the noise source, and configured to sample the noise signal to obtain a digital noise signal sample;

hardware provider logic configured to generate at least three noise signal threshold values, the at least three noise signal threshold values being selected such that a first probability of the digital noise signal sample being between the first and second noise signal threshold values, and a second probability of the digital noise signal sample being between the second and third noise signal threshold values are different from each other by less than a predetermined differential value or are identical; and hardware output stage, coupled to the analog-to-digital converter and to the provider logic, and configured to generate the random number having at least two digits which depend on the digital noise signal sample, wherein, if the digital noise signal sample is between the first and second noise signal threshold values, a first digit of the random number obtains a first state, and a second digit of the random number, representing a range between the second noise signal threshold value and the third noise signal threshold value, obtains a second state which differs from the first state, wherein the noise signal has a probability-density function which has been predetermined, wherein the probability of a noise signal sample being smaller than or equaling a noise signal threshold value is given by the following equation:

$$F: R \to [0, 1], F(x) := \int_{-\infty}^{x} p(y) dy$$

wherein p(y) is the probability-density function of the noise signal, wherein y is a noise signal threshold value, and wherein the hardware provider logic is configured to specify the noise signal threshold values in accordance with the following equation:

$$x_i := F^{-1}\left(\frac{i}{2_n}\right), i \in \{0, \ldots 2^n\} \qquad 5$$

wherein i is a control variable, wherein $F^{-1}$ is an inverse function of the function F, and wherein $x_i$ is the noise signal threshold value sought.

2. The apparatus as claimed in claim 1,
wherein the hardware output stage comprises at least one threshold-value gate $x_i$ into which the digital noise signal sample is fed and by which the first or second digits of the random number is determined depending on whether the digital noise signal sample exceeds or falls below the second threshold value.

3. The apparatus as claimed in claim 1,
wherein the hardware provider logic is configured to generate at least four noise signal threshold values, a smallest noise signal threshold value being a minimum noise signal sample determined by a predetermined minimum probability,
wherein a highest noise signal threshold value is a maximum noise signal sample determined by a predetermined maximum probability, and
wherein the at least two remaining noise signal threshold values are between the smallest and highest noise signal threshold values.

4. The apparatus as claimed in claim 3,
wherein each of the at least two remaining noise signal threshold values has a threshold-value gate of its own provided for it, a specific digit of the random number being determinable by each threshold-value gate, the logical state of each digit of the random number depending on whether the digital noise signal sample falls below or exceeds the threshold value associated with the respective threshold-value gate.

5. The apparatus as claimed in claim 4,
wherein at least three remaining noise signal threshold values are present, and which further comprises:
an encoder, coupled to the hardware output stage, and configured to encode the random number to obtain an encoded random number having a smaller redundancy than the random number.

6. The apparatus as claimed in claim 5,
wherein the random number and the encoded random number are binary, and the first state is a first binary state, and the second state is a second binary state differing from the first binary state.

7. The apparatus as claimed in claim 6,
wherein the encoder comprises a table, by means of which an encoded random number is uniquely associated with a random number, the encoded random number comprising fewer digits than the random number.

8. The apparatus as claimed in claim 6,
wherein the encoder is configured to implement the following logical equation:

$$y_{n-i} = \bigoplus_{q=2^{(n-1)}\pm\ldots\pm2^{(n-i)}-1} \hat{x}_{q'} \quad i = 1, \ldots, n \qquad (2)$$

wherein $\hat{x}_q$ is a digit of the random number with an index q,
wherein $y_{n-i}$ is a digit of the encoded random number with an index;

wherein n is the number of digits of the encoded random number;
wherein i is a control valuable running from 1 to n, and
wherein $\oplus$ is a modulo-2 addition of the digits $X_q$ which are calculated by means of the following equation:

$$q=2^{(n-1)}\pm\ldots\pm2^{(n-i)}-1.$$

9. The apparatus as claimed in claim 5,
wherein the hardware provider logic comprises:
a monitor configured to monitor the encoded random numbers;
a transmitter configured to transmit a statistical distribution of the encoded random numbers; and
an adapter configured to adapt the noise signal threshold values to reduce a deviation between the first and second probabilities.

10. The apparatus as claimed in claim 1,
wherein the hardware provider logic comprises:
a monitor configured to monitor the digital noise signal samples, the noise signal, or the random number;
a transmitter configured to transmit a statistical distribution of a monitored variable; and
an adapter configured to adapt the noise signal threshold values to reduce a deviation between the first and second probabilities.

11. The apparatus as claimed in claim 10,
wherein the monitor comprises a memory having a sequence of memory cells arranged in an ascending order,
wherein noise signal values or noise signal samples are sorted into the memory cell sequence depending on their magnitude,
wherein the hardware provider logic is configured to read out memory cells with equally spaced- apart ordinal numbers, each threshold value being assigned a memory cell to be read out, and
wherein the provider logic is further configured to set a noise signal threshold value to a value stored in the memory cell with the ordinal number associated with the noise signal threshold value.

12. The apparatus as claimed in claim 11, wherein re-setting of a noise signal threshold value is performed in an event of a predetermined deviation, at a predetermined point in time or in connection with a detection of a new digital noise signal sample.

13. The apparatus as claimed in claim 1,
wherein the hardware provider logic is configured
to detect a noise value defined by the digital noise signal sample,
to ascertain whether the noise value is higher or smaller than one of the noise signal threshold values,
to perform an incrementation of the noise signal threshold value by an incrementation value in an event that a "higher" condition has been ascertained, or to perform a decrementation of the noise signal threshold value by a decrementation value in the event that a "smaller" condition has been ascertained, and to use the incremented and/or decremented noise signal threshold value as an adapted noise signal threshold value.

14. The apparatus as claimed in claim 13,
wherein an adapted noise signal threshold value is formed using several iteration steps, the incrementation or decrementation value being reduced with each iteration step, and
wherein the incrementation or decrementation value is reset to the initial value after a predetermined number of iteration steps.

15. The apparatus as claimed in claim 1, wherein the random number is used in a cryptographic application.

16. A method for generating a random number, comprising:
- generating a noise signal using a noise source;
- sampling the noise signal using an analog-to-digital converter, which is coupled to the noise source, to obtain a digital noise signal sample;
- generating at least three noise signal threshold values using hardware provider logic, the at least three noise signal threshold values being selected such that a first probability of the digital noise signal sample being between the first and second noise signal threshold values, and a second probability of the digital noise signal sample being between the second and third noise signal threshold values are different from each other by less than a predetermined differential value or are identical; and
- outputting the random number having at least two digits which depend on the digital noise signal sample using a hardware output stage which is coupled to the analog-to-digital converter and to the hardware provider logic, wherein, if the digital noise signal sample is between the first and second noise signal threshold values, a first digit of the random number obtains a first state, and a second digit of the random number, representing a range between the second noise signal threshold value and the third noise signal threshold value, obtains a second state which differs from the first state,
- wherein the noise signal has a probability-density function which has been predetermined,
- wherein the probability of a noise signal sample being smaller than or equaling a noise signal threshold value is given by the following equation:

$$F:R \to [0, 1], F(x) := \int_{-\infty}^{x} p(y)dy$$

wherein $p(y)$ is the probability-density function of the noise signal,
wherein $y$ is a noise signal threshold value, and
wherein the step of providing includes specifying the noise signal threshold values in accordance with the following equation:

$$x_i := F^{-1}\left(\frac{i}{2_n}\right), i \in \{0, \ldots 2^n\}$$

wherein $i$ is a control variable, wherein $F^{-1}$ is an inverse function of the function F, and wherein $x_i$ is the noise signal threshold value sought.

17. An apparatus for generating a binary random number, comprising:
- an analog-to-digital converter configured to sample a noise signal to obtain a digital noise signal sample;
- hardware provider logic configured to generate at least $2^n+1$ noise signal threshold values, n being higher than or equal to 2, wherein the noise signal threshold values define $2^n$ ranges for a noise signal sample, the $2^n+1$ noise signal threshold values being selected such that probabilities of the noise signal sample being in one of the $2^n$ ranges differ from each other by less than a predetermined differential value or are identical; and
- a hardware output stage that is coupled to the analog-to-digital converter and to the hardware provider logic, and is configured to generate the binary random number having n bits which depend on the digital noise signal sample, the n bits of the binary random number being determined such that each bit combination of the n bits of the binary random number is uniquely associated with one of the $2^n$ ranges,
- wherein the noise signal has a probability-density function which has been predetermined,
- wherein the probability of a noise signal sample being smaller than or equaling a noise signal threshold value is given by the following equation:

$$F:R \to [0, 1], F(x) := \int_{-\infty}^{x} p(y)dy$$

wherein $p(y)$ is the probability-density function of the noise signal,
wherein $y$ is a noise signal threshold value, and
wherein the hardware provider logic is configured to specify the noise signal threshold values in accordance with the following equation:

$$x_i := F^{-1}\left(\frac{i}{2_n}\right), i \in \{0, \ldots 2^n\}$$

wherein $i$ is a control variable, wherein $F^{-1}$ is an inverse function of the function F, and wherein $x_i$ is the noise signal threshold value sought.

18. The apparatus as claimed in claim 17, wherein the hardware provider logic is configured to adaptively track the noise signal threshold values.

19. A method for generating a binary random number, comprising:
- generating a noise signal using a noise source;
- sampling the noise signal using an analog-to-digital converter, which is coupled to the noise source, to obtain a digital noise signal sample;
- providing at least $2^n+1$ noise signal threshold values using hardware provider logic, n being higher than or equal to 2, wherein the noise signal threshold values define $2^n$ ranges for a noise signal sample, the $2^n+1$ noise signal threshold values being selected such that probabilities of the noise signal sample being in one of the $2^n$ ranges differ from each other by less than a predetermined differential value or are identical; and
- generating and outputting the binary random number having n bits which depend on the digital noise signal sample using a hardware output stage which is coupled to the analog-to-digital converter and to the hardware provider logic, the n bits of the binary random number being determined such that each bit combination of the n bits of the binary random number is uniquely associated with one of the $2^n$ ranges,
- wherein the noise signal has a probability-density function which has been predetermined,
- wherein the probability of a noise signal sample being smaller than or equaling a noise signal threshold value is given by the following equation:

$$F:R \to [0, 1], F(x) := \int_{-\infty}^{x} p(y)dy$$

wherein p(y) is the probability-density function of the noise signal, wherein y is a noise signal threshold value, and wherein the step of providing includes specifying the noise signal threshold values in accordance with the following equation:

$$x_i := F^{-1}\left(\frac{i}{2_n}\right), i \in \{0, \ldots 2^n\}$$

wherein i is a control variable, wherein $F^{-1}$ is an inverse function of the function F, and wherein $x_i$ is the noise signal threshold value sought.

20. The method as claimed in claim 19, wherein the providing step includes implementing $2^{n-1}$ threshold-value gates.

21. The method as claimed in claim 19, wherein the random number is used in a cryptographic application.

* * * * *